May 8, 1945.　　　J. F. BARRY ET AL　　　2,375,272
ELECTRIC CABLE
Filed Feb. 15, 1941　　　3 Sheets-Sheet 1

INVENTORS: J. F. BARRY
M. A. LOGAN
BY
ATTORNEY

May 8, 1945.                    J. F. BARRY ET AL                    2,375,272
                                  ELECTRIC CABLE
                              Filed Feb. 15, 1941                3 Sheets-Sheet 3

INVENTORS: J.F. BARRY
           M.A. LOGAN
BY
           M.R. McKenney
              ATTORNEY Patented May 8, 1945

2,375,272

UNITED STATES PATENT OFFICE 2,375,272

ELECTRIC CABLE

Joseph F. Barry, Brooklyn, N. Y., and Mason A. Logan, Summit, N. J., assignors to Bell Telephone Laboratories, Incorporated, New York, N. Y., a corporation of New York Application February 15, 1941, Serial No. 379,078

12 Claims. (Cl. 179—174)

This invention relates to electric cables and particularly to cables used for multipling the terminals of automatic switches.

The objects of the invention are to eliminate electrical interference and disturbances between the component circuit conductors of a group or cable; to obtain a balanced relationship of the electrical constants of the component circuit conductors; to reduce the cost of constructing these cables; and in other respects to obtain improvements therein.

One convenient method of making a cable for connecting the terminals of automatic switches in multiple is to arrange the conductors of the several circuits in parallel relation on a strip of insulating material, the two conductors of each circuit pair lying side by side and spaced a suitable distance from the adjacent pairs, and to secure these conductors to the insulating strip by adhesives or by any other desired means. In cables of this type if materials having very high resistance, such as cellulose acetate, are used for the insulating strips it is possible to minimize the reactive interference between adjacent circuits by properly spacing the conductors. But these insulating materials which have high resistance characteristics are usually expensive, and it is much more desirable from an economic standpoint to use some cheaper material, such as muslin or other fabrics, for the mounting strips. Yet the disadvantage of muslin and similar cloths is that the electrical resistance is such as to cause a substantial capacity unbalance to exist between the conductors of adjacent pairs when the most desirable spacings are employed. This unbalance in the capacity relationship of the conductors of two adjacent circuits causes reactive interference or cross-talk to take place.

In accordance with the present invention, however, we have discovered that the foregoing obstacles may be overcome by controlling the resistance values of the cable mounting strips. More specifically we have discovered that by treating the cloth insulating strips with some material that reduces its electrical resistance to a low value, when compared to the capacity reactance between the conductors and the mounting strip, it is possible to attain an adequate balance in the relationship of the capacities between the several conductors of two adjacent pairs, thereby eliminating interference.

A feature of the invention, therefore, is an electric cable in which the supporting strip or mounting member to which the circuit conductors are secured is uniformly coated in whole or in part with a layer of conducting material. The effect of this conducting material is to cause the mounting strip to act as a neutral potential conductor and to prevent coupling current flow in this conductor in response to the potential differences between the conductors of adjacent pairs.

Another feature is a cable of this kind in which a coating of conducting material, such as carbon, is applied to the back side of the cloth mounting, that is, the side opposite the surface on which the conductors are secured.

A further feature is a cable comprising a cloth backing strip having one surface covered with a layer of conducting material or covered where each pair of wires is to be attached, a layer of lacquer or similar material covering the conducting layer, and circuit conductors secured to the lacquered surface.

These and other features of the invention will be discussed more fully in the following specification.

In the drawings accompanying the specification:

Although not so limited, the present invention is particularly applicable to cables used for multipling the terminal banks of the automatic switches employed in telephone systems. In these systems the usual practice is to connect the terminals of a plurality of switch banks in multiple relation by means of strap wires which extend across the rear of the switch banks and are connected to the successive terminals by soldered joints. Since each one of these many soldered joints requires a separate manual operation, the process is an expensive one. To obviate this expense numerous types of preformed cables have been suggested heretofore. Generally speaking, these multiple cables comprise a backing or mounting member and a plurality of pairs of talking conductors arranged thereon in parallel relation, the conductors being secured to the backing member by different methods, such as weaving and the use of adhesive substances.

For reasons of economy and limitations of space it is desirable to make these multiple cables as compact as possible. To do so, however, requires close spacing of the conductors of each talking pair with respect to the adjacent pairs on the mounting member. This close spacing and geometrical arrangement tends to produce electrical capacity unbalance between the conductors of different pairs, resulting in reactive interference or cross-talk. To hold this reactive interference within tolerable limits it of course becomes necessary to construct the backing member of materials having very good insulating properties. These materials, however, are usually expensive, and it would be desirable to make use of some cheaper material such as muslin or other forms of cloth. We have found that the electrical resistance of cloth is sufficiently low for it to act as a partial conductor which in combination with the inherent capacitance permits the flow of current in response to potential differences between the pairs of talking conductors. As will be explained presently, these currents resulting from the potential differences between the several conductors of the two adjacent pairs flow in a circuit which is unbalanced and produce cross-talk unless the cable is formed in accordance with the features of the present invention.

Figure 1:
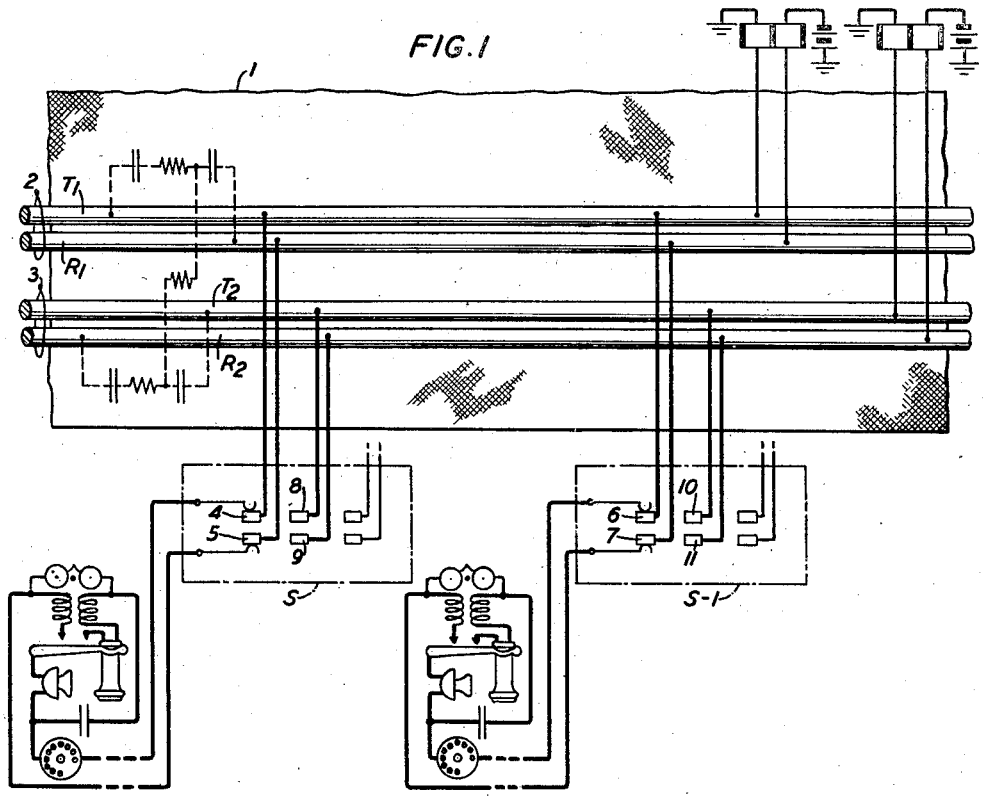
Fig. 1 shows a portion of a multiple cable incorporating the features of this invention and illustrates the manner in which it is used to connect automatic switches in multiple.

Referring to Fig. 1 of the drawings, the section of multiple cable comprises a backing or mounting strip 1 on which the requisite number of pairs of circuit conductors are mounted. While there are usually ten or more pairs of these conductors, only two pairs, 2 and 3, are illustrated in the drawings. The conductors $T_1$ and $R_1$ of the pair 2 are laid closely together on the mounting strip 1. The conductors $T_2$ and $R_2$ of the pair 3 are also in close proximity with each other but spaced at a substantial distance from the conductors of the pair 2. Similarly the remaining pairs of the cable are arranged on the backing strip 1 with like spacings. These conductors may be covered with any suitable insulation.

The multiple cable extends across the back of a plurality of automatic switches including switches S and S—1. Although only three sets of terminals are shown in each of these switches, it may be assumed that each switch has ten sets of terminals per row and that the multiple cable has ten pairs of conductors for connecting these switch terminals in multiple relation. For example, the terminals 4 and 5 of switch S, the terminals 6 and 7 of switch S—1, and the corresponding terminals in all remaining switches in the group are joined in multiple relation by the conductors $T_1$ and $R_1$, respectively. Similarly, the terminals 8 and 9 of switch S, the terminals 10 and 11 of switch S—1, and the corresponding terminals of other switches are connected in multiple by means of the cable conductors $T_2$ and $R_2$, respectively. And the same is true of the remaining terminals in the switches.

Figure 2:
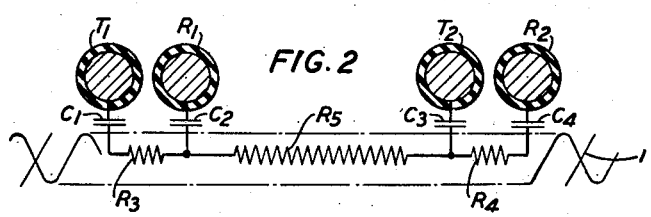
Fig. 2 is an enlarged cross-sectional view illustrating the principal electrical constants which cause cross-talk in a multiple cable.
Figure 3:
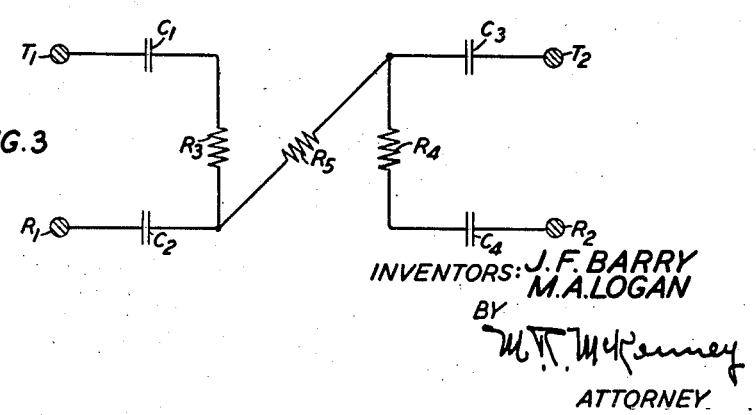
Fig. 3 is an equivalent electrical diagram for the cable shown in Fig. 2.

If the mounting strip 1 of the cable is of some material, such as cellulose acetate, having a very high electrical resistance, the capacity unbalance between the conductors of adjacent pairs may be held to tolerable values without excessive spacing of the conductors. However, if a cheaper material, such as muslin, is used, it is found that the presence of this material results in excessive interference when the desirable conductor spacings are employed. We have discovered that this interference is attributable to the partial conductivity of the cloth. The electrical constants involved, which are illustrated schematically in Fig. 1 by the resistance and capacity networks shown connected to the conductors by dotted lines, are shown more clearly in the enlarged view of Fig. 2. In this figure it is assumed that the backing strip 1, shown in cross-section, is of untreated muslin cloth. The conductors $T_1$, $R_1$, $T_2$ and $R_2$ are secured to the backing strip 1 in any suitable manner, although in the figure they are shown separated therefrom in order to facilitate the illustration of the capacities. The direct capacity between conductors $T_1$ and $R_1$ of the pair does not affect cross-talk and is not shown, but the capacity from each wire to the backing material is represented by the two equal condensers $C_1$ and $C_2$, and the resistance of the cloth 1 between conductors $T_1$ and $R_1$ is represented by the resistance element $R_3$. Similarly the capacity between the backing cloth and the conductors $T_2$ and $R_2$ of the other pair is represented by the equal condensers $C_3$ and $C_4$, and the resistance of the cloth between conductors $T_2$ and $R_2$ is represented by the resistance element $R_4$. The resistance of the cloth between conductor $R_1$ and conductor $T_2$ is represented by resistance element $R_5$. The equivalent circuit relation of these constants is shown in Fig. 3. It is estimated that at ordinary conditions of humidity the resistance $R_3$ is of the same order of magnitude as the voice-frequency reactance of $C_1$ and $C_2$, and the resistance $R_4$ is of the same order of magnitude as the voice-frequency reactance of $C_3$ and $C_4$. In any event it will be obvious from an inspection of Fig. 3 that an unbalance is present between the adjacent circuits and that reactive interference will occur.

Figure 4:
Fig. 4 is a cross-sectional view illustrating the constants involved in a cable constructed in accordance with the present invention.
Figure 5:
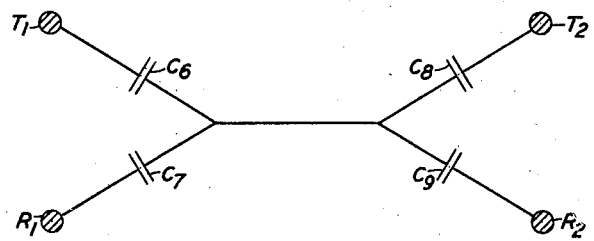
Fig. 5 is an equivalent electrical diagram for the cable shown in Fig. 4.

This unbalanced relationship between the conductors of adjacent circuits is overcome by a cable constructed as illustrated in Fig. 4. In this figure the cloth backing strip 1 is coated with a thin layer 12 of some highly conductive substance such as carbon or metals. One suitable substance for this purpose is colloidal graphite, which may be applied to the surface of the cloth with a brush. After the layer of carbon 12 has been applied, a thin layer 13 of lacquer or other similar substance may be applied over the carbon layer to preserve and protect the same. The conductors $T_1$, $R_1$, $T_2$ and $R_2$ are then secured in any suitable manner on the lacquered surface 13. Referring again to Fig. 2, it will now be seen that the resistances $R_3$, $R_4$ and $R_5$ have been reduced substantially in magnitude and made negligible in comparison with the voice-frequency reactance of the condensers by the relatively conductive layer 12 in Fig. 4. Since resistance $R_5$ has been made negligible, the capacities between conductors $T_1$ and $R_1$ and the backing cloth are connected together through the negligible resistance of the conductive material, causing the two equal condensers $C_6$ and $C_7$ to act as a voltage divider and maintain the conductive material at a neutral potential with respect to the conductors. Similarly the capacity between conductors $T_2$ and $R_2$ and the backing cloth may be represented by connected condensers $C_8$ and $C_9$. The electrical equivalent of Fig. 3 is illustrated in Fig. 5 in which condensers $C_6$, $C_7$, $C_8$ and $C_9$ are all equal to each other and are connected in a symmetrical pattern. Therefore, the cable constructed in accordance with Fig. 4 provides a balanced conductive path held at a neutral potential by the voltage divider action of the capacities of the adjacent circuits, and no reactive interference is present.

Figure 6:
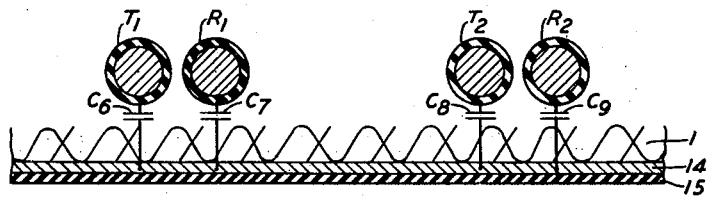
Fig. 6 is an alternative form of the cable incorporating the present invention.

Fig. 6 illustrates a modification of the cable in which the conductive layer 14 is applied to the underside of the backing cloth 1, and the layer of lacquer 15 is applied as shown to preserve and protect the conductive layer 14. Since the layer of cloth 1 is relatively thin and the conductive material may penetrate, the electrical relationship is substantially the same in Fig. 6 as in Fig. 4, and a balanced condition prevails.

Figure 7:
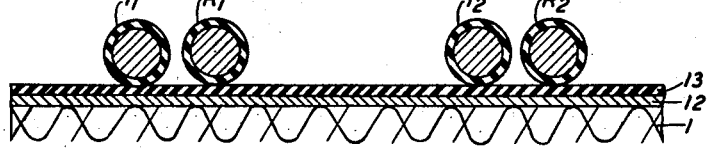
Figs. 7 and 8 are cross-sectional views of different forms of the cable showing the actual arrangement of the conductors on the mounting member.

Fig. 7 shows the same cable construction as Fig. 4. In Fig. 7, however, the representative condensers have been omitted, and the conductors $T_1$, $R_1$, $T_2$ and $R_2$ are shown in their actual positions on the lacquer surface 13.

Figure 8:

Fig. 8 shows a further modification in which the cloth backing strip 1 is impregnated with some conducting substance such as amorphous carbon or metallic dust. If desirable, the backing strip after impregnation may be covered with a lacquered surface to prevent the escape of the comminuted conducting material.

Figure 9:
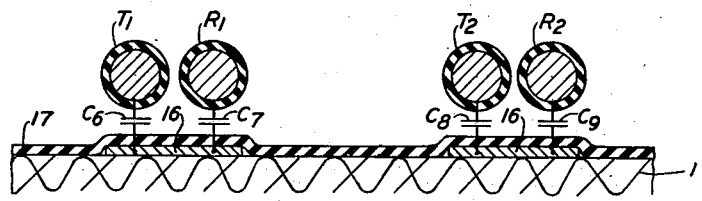
Fig. 9 shows another form of the cable.
Figure 10:
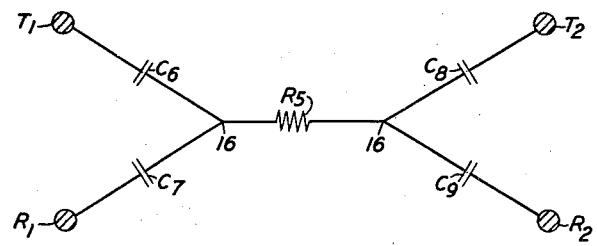
Fig. 10 is the equivalent electrical diagram therefor.

A further modification of the cable structure may be had by applying the conducting material to the cloth in strips or bands in juxtaposition with the respective conductor pairs $T_1$, $R_1$ and $T_2$, $R_2$, etc. As shown in Fig. 9 these narrow strips of conducting material 16 are located directly beneath the conductor pairs. After they have been painted or sprayed or otherwise applied to the backing cloth 1, a coating of lacquer may be applied as shown to cover the entire surface of the cloth. Since the conducting material 16 does not extend over the cloth between conductor pairs, the resistance $R_5$ of the cloth between pairs enters into the electrical circuit as illustrated in the equivalent diagram of Fig. 10. Although the resistance $R_5$ is present, the electrical pattern is nevertheless symmetrical, and no reactive interference takes place between the adjacent talking pairs.

Figure 11:
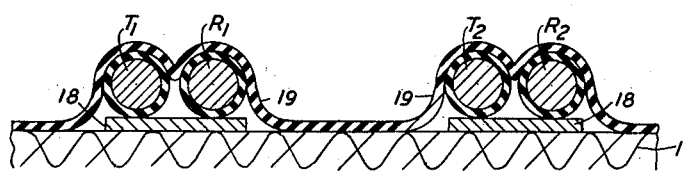
Figs. 11 and 12 show two further alternative forms of the cable.

Fig. 11 shows a further modification of the cable structure in which the conducting material is applied in strips 18 beneath the conductor pairs $T_1$, $R_1$ and $T_2$, $R_2$, and then a coating of lacquer 19 is applied over the backing cloth 1 and the conductors as shown to hold the conductors firmly in place.

Figure 12:
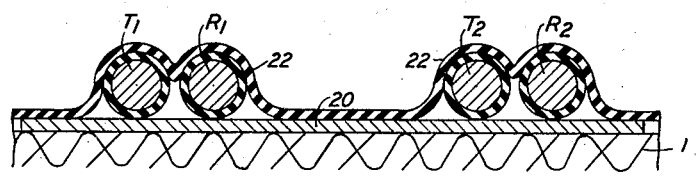

Fig. 12 shows a still further modification of the cable which is similar to Fig. 11, except that the conducting material 20 is applied over the whole surface of the backing cloth 1. The lacquer coating 22 covers both the cloth and the conductors and holds the latter in place.

Since the conductive coating on the backing cloth substantially neutralizes the condensive properties of the cloth and the wire insulation, it is possible to minimize the physical spacing between the conductor $R_1$ and conductor $T_2$. The capacity through the air between these conductors is relatively low; accordingly these conductors may be brought nearer together now that the cross-talk due to the presence of the mounting strip has been eliminated.

It will be understood that these cables may be made in other forms to incorporate the essential features of the invention. For example, the individual conducting strips illustrated in Figs. 9 and 11 may be applied to the back side of the fabric; the fabric may be impregnated with conducting material immediately under the conductor pairs; and the protective lacquer may be omitted, particularly if the conducting material consists of metallic paints or sprays.

What is claimed:

1. The combination in an electric cable of a flat insulating member, a plurality of pairs of circuit conductors secured to said member and arranged in spaced relation thereon, each of said conductors being insulated from the others, and a coating of conducting material applied to the surface of said insulating member for establishing a balanced relation between the capacities of the conductors of two adjacent circuit pairs.

2. The combination in an electric cable of a flat insulating member, a plurality of pairs of circuit conductors secured to said member, each of said conductors being insulated from the others, the two conductors of each pair lying side by side, each pair being spaced a substantial distance from the adjacent pairs, and a body of conducting material applied to said insulating member to establish a balanced relation between the capacities of the conductors of adjacent pairs.

3. The combination in an electric cable of a flat supporting member, a plurality of conductors secured to said supporting member, each of said conductors being insulated from the others, said supporting member comprising a material which acts as a partial conductor to form a dissymmetrical circuit causing a coupling current to flow in response to voltages between said conductors, and a conducting material applied to said supporting member for preventing the formation of said dissymmetrical circuit.

4. The combination in an electric cable of a strip of cloth having substantial conductivity at relatively high humidity, a plurality of insulated circuit conductors secured to said strip and arranged in circuit pairs thereon, and a layer of high conductive material on one surface of said cloth for preventing capacity coupling currents from flowing therein in response to voltages between the conductors of said circuit pairs.

5. The combination in an electric cable of a strip of cloth, a plurality of insulated circuit conductors secured on one side of said strip, and a coating of conducting material on the other side of said strip for maintaining a balanced relation between the capacities of said circuit conductors.

6. The combination in a cable for connecting in multiple the terminals of automatic switches of a strip of cloth, a coating of conducting material on the surface of said strip of cloth, a coating of insulating substance covering said coating of conducting material, and pairs of circuit conductors secured to said strip on the surface of said insulating substance, said conducting material serving to prevent the flow of capacity coupling currents in said material resulting in reactive interference between adjacent pairs of said conductors.

7. The combination in an electric cable of a strip of muslin having a substantial conductivity at ordinary humidity, two pairs of circuit conductors secured to said strip of muslin, the conductors of each pair being insulated from each other and lying in close proximity and spaced at a substantial distance from the other pair, and a body of carbon applied to said strip of muslin to prevent the flow of reactive coupling currents in the muslin responsive to potential differences between the conductors of one pair and the conductors of the other pair.

8. The combination in an electric cable of a strip of insulating material, a plurality of pairs of circuit conductors secured to said strip and arranged in parallel relation thereon, each of said conductors being insulated from the others, and a coating of conducting material applied to the surface of said insulating strip in juxtaposition to each pair of said conductors for controlling the capacity balance between said conductors.

9. The combination in an electric cable of a cloth mounting member, a plurality of pairs of circuit conductors secured to said mounting member and arranged in parallel relation thereon, each of said conductors being insulated from the others, and strips of conducting material applied to said mounting member in juxtaposition to the respective pairs of circuit conductors for establishing a balanced relation between the capacities of said conductors.

10. The combination in a cable for connecting in multiple the terminals of automatic switches of a strip of cloth, a thin body of a conducting substance applied to the surface of said strip of cloth, a thin body of an insulating substance covering said conducting substance, and pairs of circuit conductors secured to said strip on the surface of said insulating substance, said conducting substance serving to prevent the flow of capacity coupling currents resulting in reactive interference between adjacent pairs of said conductors.

11. The combination in an electric cable of a strip of cloth disposed in a plane, a thin body of conducting substance applied to the surface of said strip of cloth, and a plurality of pairs of circuit conductors insulated from each other and arranged in parallel relation and secured to the surface of said plane strip of cloth, said conducting substance serving to prevent the flow of capacity coupling currents resulting in reactive interference between adjacent pairs of said conductors.

12. The combination in an electric cable for connecting in multiple the terminals of automatic switches of a strip of cloth arranged in a plane, a body of conducting substance applied to the surface of said strip of cloth, and pairs of insulated circuit conductors arranged in parallel relation and secured to said plane strip of cloth contiguous to said body of conducting substance, said conducting substance serving to prevent the flow of capacity coupling currents resulting in reactive interference between adjacent pairs of said conductors.

JOSEPH F. BARRY.
MASON A. LOGAN.